United States Patent
Kim et al.

(10) Patent No.: US 10,534,477 B2
(45) Date of Patent: Jan. 14, 2020

(54) GATE DRIVER AND DISPLAY DEVICE HAVING IN-CELL TOUCH SENSOR USING THE SAME

(71) Applicant: LG DISPLAY CO., LTD., Seoul (KR)

(72) Inventors: Yeonkyung Kim, Daejeon (KR); Taewoong Moon, Paju-si (KR); Junghyun Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 137 days.

(21) Appl. No.: 15/798,011

(22) Filed: Oct. 30, 2017

(65) Prior Publication Data

US 2018/0121023 A1 May 3, 2018

(30) Foreign Application Priority Data

Oct. 31, 2016 (KR) .................. 10-2016-0144005

(51) Int. Cl.
- *G06F 3/041* (2006.01)
- *G06F 3/044* (2006.01)
- *G09G 3/36* (2006.01)

(52) U.S. Cl.
CPC ............ *G06F 3/0418* (2013.01); *G06F 3/044* (2013.01); *G06F 3/0412* (2013.01); *G09G 3/3677* (2013.01); *G09G 2300/0809* (2013.01); *G09G 2300/0866* (2013.01); *G09G 2310/0286* (2013.01); *G09G 2310/08* (2013.01); *G09G 2354/00* (2013.01)

(58) Field of Classification Search
CPC .... G06F 3/0412; G06F 3/0416; G06F 3/0418; G06F 3/044; G09G 2300/0809; G09G 2300/0866; G09G 2310/0286; G09G 2310/0291; G09G 2310/08; G09G 2354/00; G09G 3/3677

See application file for complete search history.

(56) References Cited

U.S. PATENT DOCUMENTS

| | | | | |
|---|---|---|---|---|
| 2010/0295804 A1* | 11/2010 | Takeuchi | ............ | G02F 1/13338 345/173 |
| 2013/0063405 A1* | 3/2013 | Zhou | .................... | G09G 3/3674 345/204 |
| 2014/0184568 A1* | 7/2014 | Kim | ....................... | G06F 3/0412 345/175 |
| 2014/0225848 A1* | 8/2014 | Ogura | ...................... | G06F 3/041 345/173 |
| 2015/0170611 A1* | 6/2015 | Noto | ........................ | G09G 5/18 345/173 |
| 2016/0094236 A1* | 3/2016 | Shionoiri | .............. | H03M 1/002 341/122 |
| 2016/0217728 A1* | 7/2016 | In | ......................... | G09G 3/3275 |

(Continued)

*Primary Examiner* — Afroza Chowdhury
(74) *Attorney, Agent, or Firm* — Seed Intellectual Property Law Group LLP

(57) ABSTRACT

A gate driver and a display device having an in-cell touch sensor using the gate driver are disclosed. The gate driver includes a shift register configured to sequentially supply gate pulses to gate lines of a display panel. The shift register includes an (N−1)th stage, where N is a positive integer equal to or greater than 2, configured to output an (N−1)th gate pulse, an Nth stage configured to output an Nth gate pulse, and a hold circuit configured to hold an output voltage of the (N−1)th stage during a predetermined time and supply the output voltage to the Nth stage.

19 Claims, 13 Drawing Sheets

(56) References Cited

U.S. PATENT DOCUMENTS

2016/0240145 A1* 8/2016 Jeong .................... G09G 3/3233
2016/0378232 A1* 12/2016 Hsu ...................... G09G 3/3677
                                                            345/174

* cited by examiner

GATE DRIVER AND DISPLAY DEVICE HAVING IN-CELL TOUCH SENSOR USING THE SAME

This application claims the priority benefit of Korean Patent Application No. 10-2016-0144005 filed on Oct. 31, 2016, the entire contents of which is incorporated herein by reference for all purposes as if fully set forth herein.

BACKGROUND

Technical Field

The present disclosure relates to a gate driver including a hold circuit, and a display device having an in-cell touch sensor using the gate driver.

Description of the Related Art

A user interface (UI) enables communication between a person (a user) and various electric or electronic devices, and allows the user to easily control the devices as desired. Representative examples of the user interface include a keypad, a keyboard, a mouse, an on-screen display (OSD), a remote controller having infrared communication or radio frequency (RF) communication functions. User interface technology has been developed to enhance the user's emotion and operational convenience. Recently, the user interface has been developed into a touch UI, a voice recognition UI, a 3D UI, and the like.

The touch UI implements a touch screen on a display panel to sense a touch input and transmit a user input to the electronic device. The touch UI is essential for portable information devices such as smart phones, and is being applied to notebook computers, computer monitors, and home appliances.

Techniques for implementing a touch screen using a technique (hereinafter, referred to as "in-cell touch sensor") of embedding touch sensors in a pixel array of the display panel have been applied to various display devices. The touch sensors can be implemented as capacitive type touch sensors that sense a touch based on a change in capacitance before and after the touch.

The in-cell touch sensor technique can provide in-cell touch sensors (C1 to C4) as shown in FIG. 1 on the display panel without increasing a thickness of the display panel. The in-cell touch sensors (C1 to C4) are connected to a touch sensing unit 2 through sensor lines 4. The touch sensing unit 2 supplies electric charges to the touch sensors C1 to C4 through the sensor lines 4 and senses the touch input based on an amount of change in capacitance of the sensors C1 to C4 depending on presence or absence of the touch. In FIG. 1, "Cs" represents the capacitance of the in-cell touch sensor.

Since the in-cell touch sensors C1 to C4 are embedded in the pixel array of the display panel, the in-cell touch sensors C1 to C4 are coupled to pixels through a parasitic capacitance. In order to reduce mutual influence due to the coupling of the pixels and the in-cell touch sensors C1 to C4, the in-cell touch sensor technique time-divides one frame period into a display period and a touch sensing period. A common voltage Vcom, which is a reference voltage of the pixels, is supplied to the in-cell touch sensors C1 to C4 during the display period. The in-cell touch sensors (C1 to C4) are driven to sense the touch input during the touch sensing period.

The display device includes a data driver for supplying a data voltage to data lines of the display panel, a gate driver (or a scan driver) for supplying a gate pulse (or a scan pulse) to gate lines of the display panel, and a touch sensing unit for driving the touch sensors.

The gate driver sequentially shifts the gate pulse applied to the gate lines by using a shift register. The gate pulse sequentially selects the pixels to be charged with the data voltage one line by one line in synchronization with a data voltage of an input image, that is, a pixel voltage. The shift register includes stages that are connected in a cascade connection manner. A stage of the shift register receives a start pulse or a carry signal received from a previous stage as a start pulse, and generates an output when a clock is input.

The shift register of the gate driver may be mounted together with the pixel array on a substrate of the display panel. Hereinafter, the shift register mounted on the substrate of the display panel is referred to as a gate in panel (GIP) circuit.

A screen of the display device may be divided into two or more blocks, and a touch sensing period may be allocated therebetween. For example, during a first display period, pixels of a first block may be driven to update data of the first block to be a current frame data, and then after transition to the touch sensing period to sense the touch input, during a second display period, pixels of a second block may be driven to update data of the second block to be a current frame data. This method may cause degradation of output characteristics of the gate pulse supplied to the gate lines, thereby resulting in poor image quality. For example, a voltage of a Q node may be discharged due to a leakage current during the touch sensing period in a stage of a shift register that outputs a first gate pulse in the second block driven immediately after the touch sensing period. Since the Q node is connected to a gate of a pull-up transistor, when the voltage of the Q node becomes low, bootstrapping operation for turning on the pull-up transistor becomes incomplete, so that a voltage of the gate pulse of which the voltage is raised by the pull-up transistor may not rise to a target voltage. As a result, a voltage of the first gate pulse, which is generated when the pixels of the second block start to be driven, is lowered, and luminance of pixels arranged in a first line of the second block is lowered. As a result, image degradation such as line dim can be seen.

A dummy stage or a bridge circuit may be added to the gate driver. The dummy stage charges a Q node of a stage generating a first output in a next block where the pixels are driven again immediately after the touch sensing period during the touch sensing period to suppress discharge of the Q node.

The dummy stage includes many transistors because it has substantially the same circuit configuration as the other stages for outputting the gate pulse. Therefore, when the dummy stage is added to a GIP circuit, a bezel becomes large, so that a narrow bezel design is difficult to achieve.

The Q node of the dummy stage maintains a charged state during the touch sensing period and, due to a voltage output from the dummy stage, a charging time of a first Q node voltage of the next block generating the output immediately after the touch sensing period becomes longer than a charging time of the other Q node voltages. As a result, a DC gate bias stress of a pull-up transistor connected to the Q node of the dummy stage and a pull-up transistor connected to the Q node of the stage that generates the first output of the next block becomes larger. Due to the deterioration of the pull-up transistors, a voltage different from the output of the other stages may be output, thereby resulting in image degradation such as line dim.

BRIEF SUMMARY

The disclosure provides a gate driver capable of preventing stress deviation between stages of a GIP circuit, implementing a narrow bezel, driving pixels and touch sensors without degrading an image quality, and a display device having an in-cell touch sensor using the same.

In one embodiment, there is provided a gate driver including a shift register configured to sequentially supply gate pulses to gate lines of a display panel.

The shift register includes an (N−1)th stage, where N is a positive integer equal to or greater than 2, configured to output an (N−1)th gate pulse, an Nth stage configured to output an Nth gate pulse, and a hold circuit configured to hold an output voltage of the (N−1)th stage during a predetermined time and supply the output voltage to the Nth stage.

The predetermined time may include a touch sensing period of the display panel, in which the touch sensors are driven.

The output voltage of the (N−1)th stage may include either the (N−1)th gate pulse, a carry signal transmitted to another stage, or a separate output voltage different from the (N−1)th gate pulse and the carry signal.

The hold circuit may be connected between an output terminal of the (N−1)th stage and a start input terminal of the Nth stage, store the output voltage of the (N−1)th stage during the predetermined time, and supply the stored voltage to the start input terminal of the Nth stage before an end of the predetermined time.

The (N−1)th stage may generate the output voltage through the output terminal when a first clock signal is input.

Each of the (N−1)th stage and the Nth stage may include a respective pull-up transistor having a gate connected to a respective Q node to raise a voltage of a respective gate pulse depending on a voltage of the Q node. The Q node of the Nth stage may be charged based on the output voltage supplied through the hold circuit.

The hold circuit may include a first transistor including a gate connected to the output terminal of the (N−1)th stage, a first electrode to which a second clock signal that is generated following the first clock is applied, and a second electrode connected to a hold node, a second transistor including a gate to which a third clock signal that is generated following the second clock is applied, a first electrode connected to the hold node, and a second electrode connected to the start input terminal of the Nth stage, a third transistor including a gate to which at least one of an output voltage of the Nth stage or a fourth clock signal that is generated following the output voltage of the Nth stage is applied, a first electrode connected to the hold node, and a second electrode to which a gate-off voltage is applied, and a capacitor including a first electrode connected to the hold node and a second electrode to which the gate-off voltage is applied. The gate-off voltage may be lower than a threshold voltage of the first, second, and third transistors.

The Q node of the Nth stage may maintain an uncharged state during the predetermined time except for a portion of the predetermined time in which the third clock signal is generated, and may be charged when the second transistor is turned on based on the third clock signal.

The transistors may include an oxide semiconductor.

In another embodiment, there is provided a display device including a display panel in which data lines and gate lines are arranged in intersecting directions, pixels are arranged in a matrix form, a screen including the pixels and touch sensors is divided into at least first and second blocks, and the first and second blocks are time-divisionally driven during first and second display periods, respectively, with a touch sensing period between the first and second display periods, a display driver configured to drive pixels of the first block during the first display period, drive pixels of the second block during the second display period after the touch sensing period, and write data of an input image to the pixels of the first and second blocks, and a touch sensing unit configured to sense a touch input by driving the touch sensors during the touch sensing period.

The display driver includes a shift register configured to sequentially supply gate pulses to the gate lines.

The shift register includes an (N−1)th stage, where N is a positive integer equal to or greater than 2, configured to output a last gate pulse of the first display period, an Nth stage configured to output a first gate pulse of the second display period at a time corresponding to a start of the second display period after the touch sensing period, and a hold circuit configured to hold an output voltage of the (N−1)th stage during the touch sensing period and supply the output voltage to the Nth stage.

In yet another embodiment, the present disclosure provides a display device that includes a pixel array, a plurality of gate lines coupled to respective pluralities of pixels of the pixel array, a plurality of touch sensors embedded in the pixel array, and a gate driver. The gate driver includes a shift register that includes a first stage, a second stage, and a hold circuit. The first stage is coupled to a first gate line, and the second stage is coupled to a second gate line. The hold circuit is coupled between the first stage and the second stage and is configured to hold a voltage in response to receiving an output of the first stage.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Figure 1:
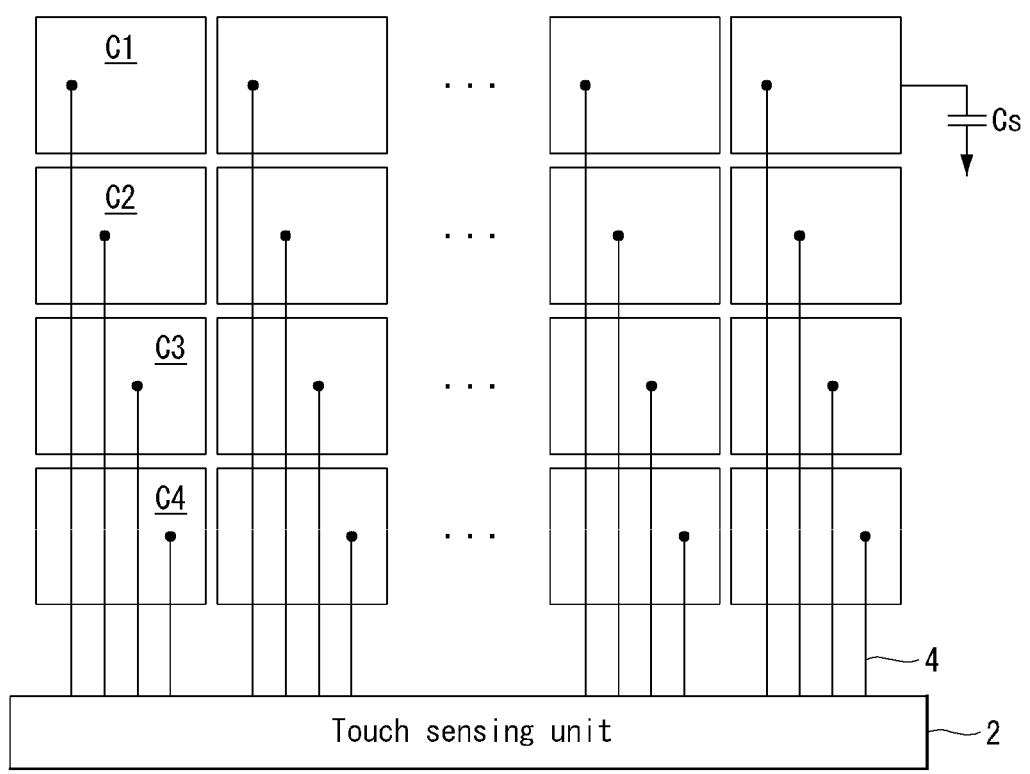
FIG. 1 is a diagram illustrating an arrangement of touch sensors and a touch sensing unit, as known in the related art.

Advantages and features of the present disclosure and methods for accomplishing the same will become apparent with reference to embodiments described in detail below with reference to the accompanying drawings. However, the present disclosure is not limited to the embodiments disclosed below, and may be implemented in various forms. These embodiments are provided so that the present disclosure will be exhaustively and completely described, and will fully convey the scope of the present disclosure to those skilled in the art to which the present disclosure pertains. The present disclosure is defined by the scope of the claims.

Shapes, sizes, ratios, angles, number, and the like illustrated in the drawings for describing embodiments of the present disclosure are merely exemplary, and embodiments of the present disclosure are not limited thereto. Like reference numerals designate like elements throughout the description. In the following description, when a detailed description of well-known functions or configurations related to this document is determined to unnecessarily cloud a gist of the disclosure, the detailed description thereof will be omitted. In the present disclosure, when the terms "include", "have", "comprised of", etc., are used, other components may be added unless "~ only" is used. A singular expression can include a plural expression as long as it does not have an apparently different meaning in context.

In the explanation of components, even if there is no separate description, it is interpreted as including an error range.

In the description of position relationship, when a structure is described as being positioned "on or above", "under or below", "next to" another structure, this description should be construed as including a case in which the structures contact each other as well as a case in which a third structure is disposed therebetween.

In the following description of the embodiment, the terms "first", "second", etc., may be used to describe various components, but the components are not limited by such terms. These terms are only used to distinguish one component from another component. Therefore, the first component mentioned below may be the second component within the technical spirit of the disclosure.

The features of various embodiments of the present disclosure can be partially combined or entirely combined with each other, and is technically capable of various interlocking and driving. The embodiments can be independently implemented, or can be implemented in conjunction with each other.

Hereinafter, preferred embodiments of the disclosure will be described in detail with reference to the accompanying drawings. In the following description, when a detailed description of well-known functions or configurations related to this document is determined to unnecessarily cloud a gist of the disclosure, the detailed description thereof will be omitted. Like reference numerals designate like elements throughout the description.

A display device according to an embodiment of the disclosure may be implemented as a flat panel display device such as a liquid crystal display (LCD), an OLED display, or the like. In the following embodiments, the liquid crystal display is described as an example of the flat panel display device, but the disclosure is not limited thereto. For example, the disclosure is applicable to any display device in which a multiplexer is disposed between a data driver and data lines, and a gamma compensation voltage is required in driving the data driver.

Various embodiments of the present disclosure will be described in detail below with reference to the accompanying drawings. Like reference numerals designate like elements throughout the description. In the following description, when a detailed description of well-known functions or configurations related to this document is determined to unnecessarily cloud a gist of the disclosure, the detailed description thereof will be omitted.

The display device according to an embodiment of the disclosure can be implemented as a flat panel display device such as a liquid crystal display (LCD), an organic light emitting diode (OLED) display, or the like. In the following embodiments, the liquid crystal display will be described as an example of the flat panel display device, but the disclosure is not limited thereto. For example, the disclosure can be applied to any display device including an in-cell touch sensor.

A gate driver according to an embodiment of the disclosure may be implemented as a thin film transistor (TFT) of an n-type or p-type metal oxide semiconductor field effect transistor (MOSFET) structure. Although an n-type TFT is used as an example in describing the following embodiments, it should be noted that the embodiments of the disclosure are not limited to this. The TFT is a three-electrode element including a gate, a source, and a drain. The source is an electrode that supplies carriers to the transistor. In the TFT, the carriers start to flow from the source. The drain is an electrode in which the carriers exit from the TFT to the outside. That is, the carriers in the MOSFET flow from the source to the drain. In an instance of the n-type MOSFET (NMOS), since the carriers are electrons, a source voltage is lower than a drain voltage so that the electrons can flow from the source to the drain. In the n-type MOSFET, a current flows from the drain to the source because the electrons flow from the source to the drain. In an instance of the p-type MOSFET (PMOS), since the carriers are holes, the source voltage is higher than the drain voltage so that the holes can flow from the source to the drain. In the p-type MOSFET, the current flows from the source to the drain because the holes flow from the source to the drain. It should be noted that the source and drain of the MOSFET are not fixed. For example, the source and the drain of the MOSFET may be changed depending on an applied voltage. In the following description of the embodiment, the source and the drain of the transistor will be referred to as first and second electrodes. It should be noted that the disclosure is not limited by the source and drain of the transistor in the following description.

The TFTs constituting the gate driver according to an embodiment of the disclosure may be implemented as one or more TFTs among a TFT (oxide TFT) including an oxide semiconductor, a TFT including amorphous silicon (a-Si), and a TFT (LTPS TFT) including low temperature polysilicon (LTPS).

In the display device according to an embodiment of the disclosure, a driver includes a display driver and a touch sensing unit. The display driver drives pixels of a first block during a first display period and drives pixels of a second block during a second display period to write data of an input image to the pixels of the first and second blocks. The touch sensing unit drives touch sensors during a touch sensing driving period between the first display period and the second display period to sense a touch input.

Referring to FIGS. 2 to 5, a display device according to an embodiment of the disclosure includes a display panel 100, a display driver for writing data of an input image into a pixel array 10 of the display panel 100, a touch sensing unit 110 for driving in-cell touch sensors, and the like.

The display panel 100 includes data lines 12, gate lines 14 arranged in a direction transverse to the data lines 12, and a pixel array 10 in which pixels are arranged in a matrix form defined by the data lines 12 and the gate lines 14. The pixel array 10 implements a screen on which the input image is displayed.

The pixels of the pixel array 10 may include red (R), green (G), and blue (B) sub-pixels for color implementation. Each of the pixels may further include a white (W) sub-pixel in addition to the RGB sub-pixels.

Figure 3:
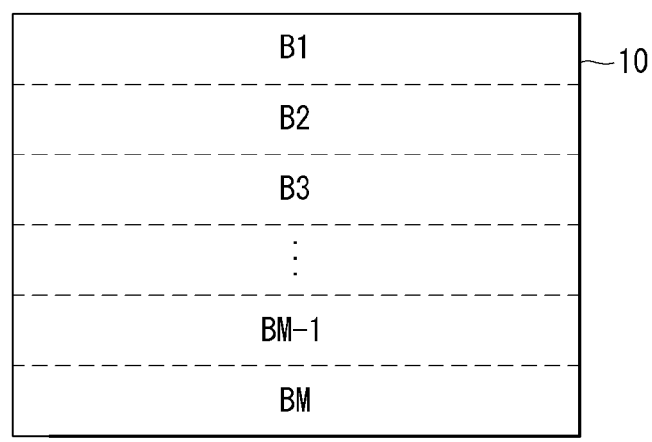
FIG. 3 is a diagram illustrating an example in which a screen is divided into a plurality of blocks in order to time-divisionally drive pixels of the screen and in-cell touch sensors.
Figure 3:
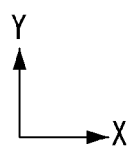

One frame period of the display panel 100 may be time-divided into one or more display periods and one or more touch sensing periods to drive the pixels 11 and the in-cell touch sensors C1 to C4 which are embedded in the pixel array 10. Although only four in-cell touch sensors C1 to C4 are labeled in FIG. 5, the label "C1 to C4" for the in-cell touch sensors refers to all of the in-cell touch sensors that are embedded in the pixel array 10. That is, as used herein, the "in-cell touch sensors C1 to C4" refers to the entire array of in-cell touch sensors embedded in the pixel array 10. The pixel array 10 of the display panel 100 is time-divisionally driven in two or more blocks B1 to BM as shown in FIG. 3. The pixel array 10 of the display panel 100 is dividedly driven during the display periods which are separated by the touch sensing period during which the in-cell touch sensors C1 to C4 are driven. That is, each touch sensing period may be interposed between two display periods.

The blocks B1 to BM on the screen need not be physically divided. For example, each of the blocks B1 to BM may include a respective subset of pixels 11 of the pixel array 10, but there does not need to be any additional elements that physically separates or divides the subsets of pixels 11 included in each of the blocks B1 to BM. The blocks B1 to BM are time-divisionally driven during display periods, with the touch sensing period therebetween. For example, during a first display period, pixels of a first block B1 are driven and a current frame data is written to the pixels, and then a touch input is sensed in the entire screen during a first touch sensing period. After the first touch sensing period, during a second display period, pixels of a second block B2 are driven and a current frame data is written to the pixels.

Then, a touch input is sensed in the entire screen during a second touch sensing period. Such a method of driving the in-cell touch sensors can make a touch report rate faster than a frame rate of the screen. The frame rate is a frequency for updating frame data on the screen, and is 60 Hz in the National Television Standards Committee (NTSC) system. The touch report rate is a frequency at which touch input coordinates are generated for the entire screen. According to an embodiment of the disclosure, the screen is divided and driven in units of preset blocks, and the in-cell touch sensors are driven between the display periods to generate touch input coordinates, thereby increasing touch sensitivity by making the touch report rate two times faster than the frame rate of the screen.

The pixel array 10 of the display panel 100 may be divided into a TFT array and a color filter array. The TFT array may be formed on a lower substrate of the display panel 100. The TFT array includes thin film transistors (TFTs) formed at intersections of the data lines 12 and the gate lines 14, a pixel electrode for charging a data voltage, a storage capacitor Cst connected to the pixel electrode to maintain the data voltage, and the like, and displays the input image. The TFT array includes sensor lines 16 and electrodes of the in-cell touch sensors C1 to C4 connected to the sensor lines 16.

The color filter array may be formed on an upper substrate or the lower substrate of the display panel 100. The color filter array includes a black matrix, a color filter, and the like. In an instance of a color filter on TFT (COT) or a TFT on color filter (TOC) model, the color filter and the black matrix may be arranged on one substrate together with the TFT array.

Figure 5:
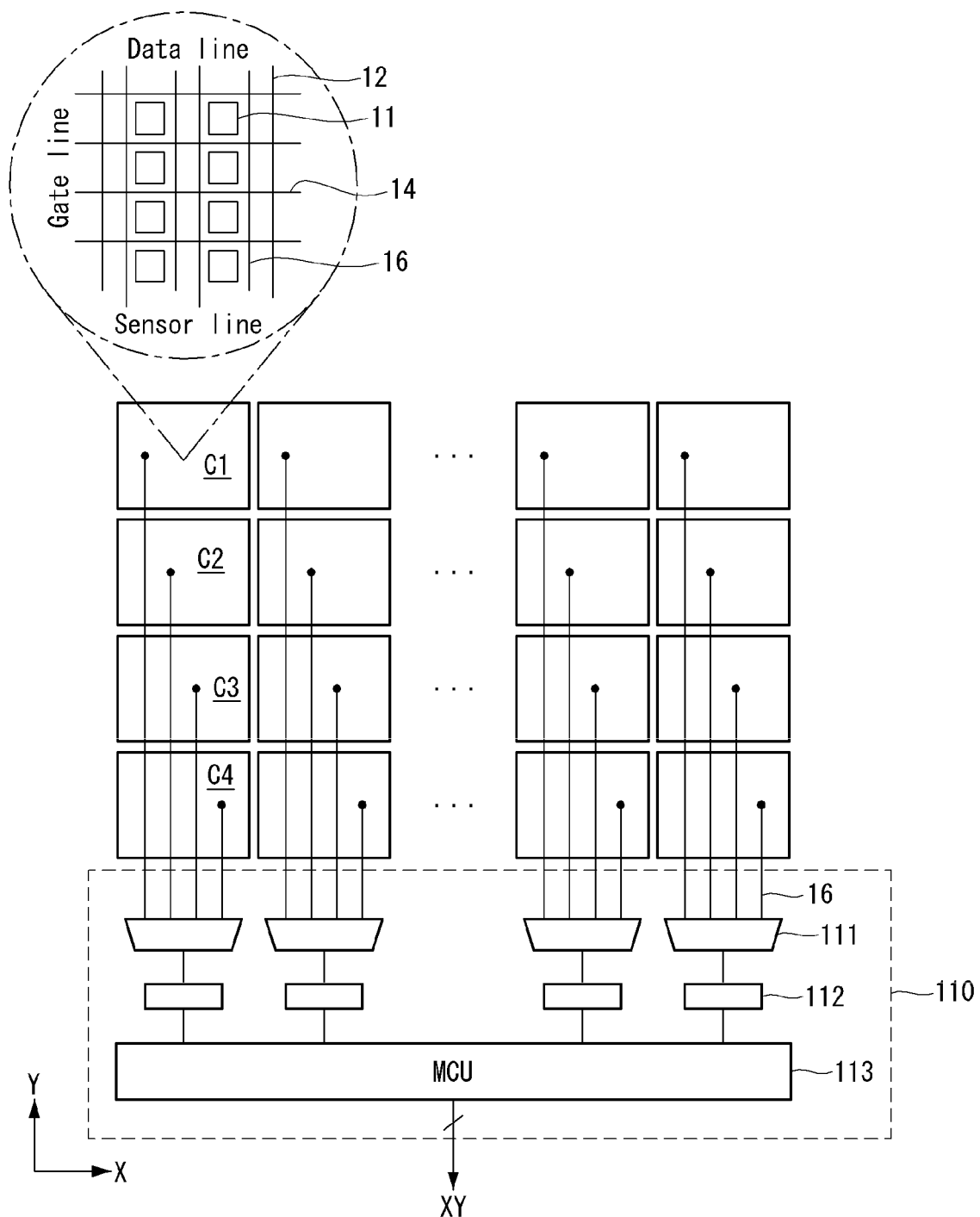
FIG. 5 is a diagram illustrating a circuit configuration of in-cell touch sensors and a touch sensing unit.

The in-cell touch sensors may be implemented as capacitive type touch sensors, for example, mutual capacitance touch sensors or self capacitance touch sensors. A self capacitance is formed along a conductor wiring of a single layer formed in one direction. A mutual capacitance is formed between two orthogonal conductor wirings. Although FIG. 5 illustrates the self capacitance touch sensors, the in-cell touch sensors of the disclosure are not limited thereto.

The in-cell touch sensors C1 to C4 may be implemented as electrodes divided from a common electrode of the pixels 11. The in-cell touch sensors C1 to C4 are connected to the touch sensing unit 110 through the sensor lines 16.

The display driver includes a data driver 102 and gate drivers 104 and 108 to write the data of the input image to the pixels of the display panel 100.

The data driver 102 includes one or more source driver ICs. The source driver IC may be mounted on a chip on film (COF) and connected between the display panel 100 and a printed circuit board (PCB). The source driver IC may be directly bonded on a substrate of the display panel 100 by a chip on glass (COG) process.

The data driver 102 converts digital video data of the input image received from a timing controller (TCON) 106 into a gamma compensation voltage to output a data voltage. The data voltage output from the data driver 102 is supplied to the data lines 12. A multiplexer (not shown) may be disposed between the data driver 102 and the data lines 12. The multiplexer distributes the data voltage received from the data driver 102 to the data lines 12 under a control of the timing controller 106. In an instance of a 1:3 multiplexer, the multiplexer time-divides the data voltage input through one output channel of the data driver 102 and supplies the data voltage to three data lines in a time division manner. By using the 1:3 multiplexer, the number of channels of the data driver 102 can be reduced to 1/3. Other multiplexers may be utilized in various embodiments provided herein, e.g., 1-to-2 multiplexers, 1-to-4 multiplexers, and so on.

Figure 2:
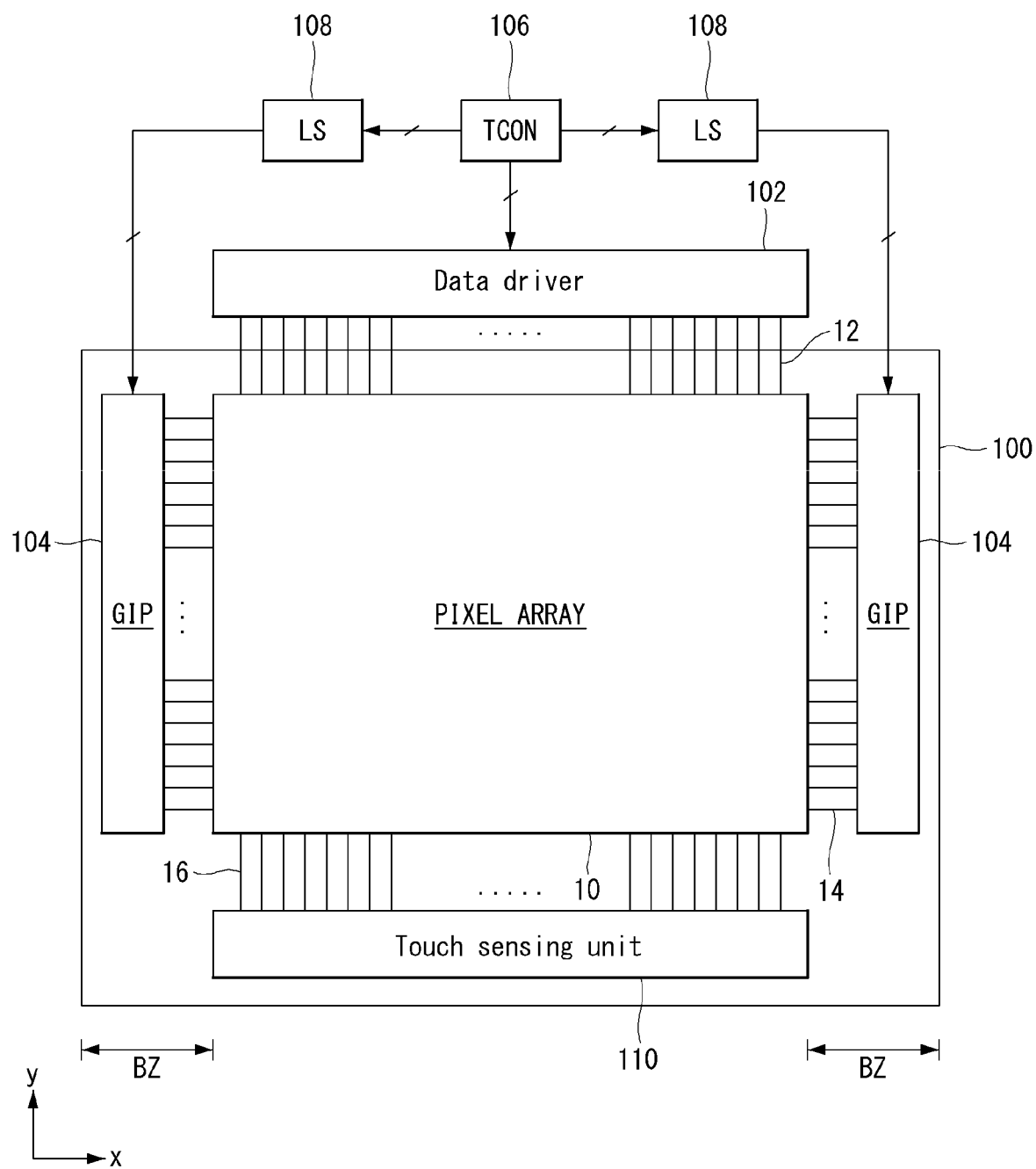
FIG. 2 is a block diagram schematically illustrating a display device according to an embodiment of the disclosure.

The gate drivers 104 and 108 include a level shifter (LS) 108 and a GIP circuit 104. The level shifter 108 is disposed between the timing controller 106 and the GIP circuit 104. The GIP circuit 104 may be formed directly on the lower substrate of the display panel 100 together with the TFT array. The GIP circuit 104 may include multiple GIP circuits, for example, two GIP circuits 104 may be formed on opposite sides of the pixel array 10 as shown in FIG. 2.

The GIP circuit 104 includes a shift register. The GIP circuit 104 may be formed in a bezel BZ at one side edge of the display panel 100 outside the pixel array 10, or may be formed in a bezel BZ at both side edges. The level shifter 108 shifts a swing width of a gate timing control signal received from the timing controller 106 to a gate-on voltage and a gate-off voltage and outputs the swing width to the GIP circuit 104. In the NMOS, the gate-on voltage is a gate-on voltage (VGH) that is higher than a threshold voltage of the NMOS and the gate-off voltage is a gate-off voltage (VGL) that is lower than the threshold voltage of the NMOS. In the PMOS, the gate-on voltage is the gate-off voltage (VGL) and the gate-off voltage is the gate-on voltage (VGH). Hereinafter, transistors of the GIP circuit 104 will be described with reference to the NMOS, but embodiments of the disclosure are not limited thereto.

Figure 4:
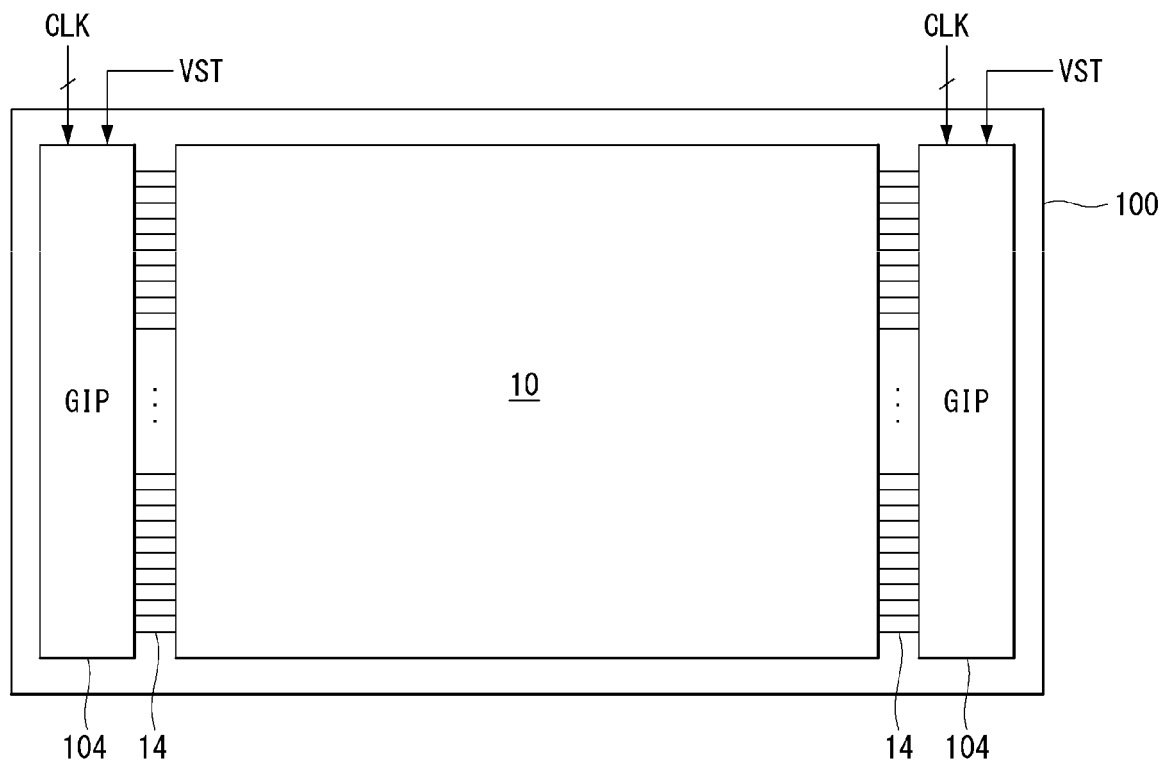
FIG. 4 is a diagram illustrating shift clocks and start pulses applied to GIP circuits arranged on both sides of a screen.
Figure 6:
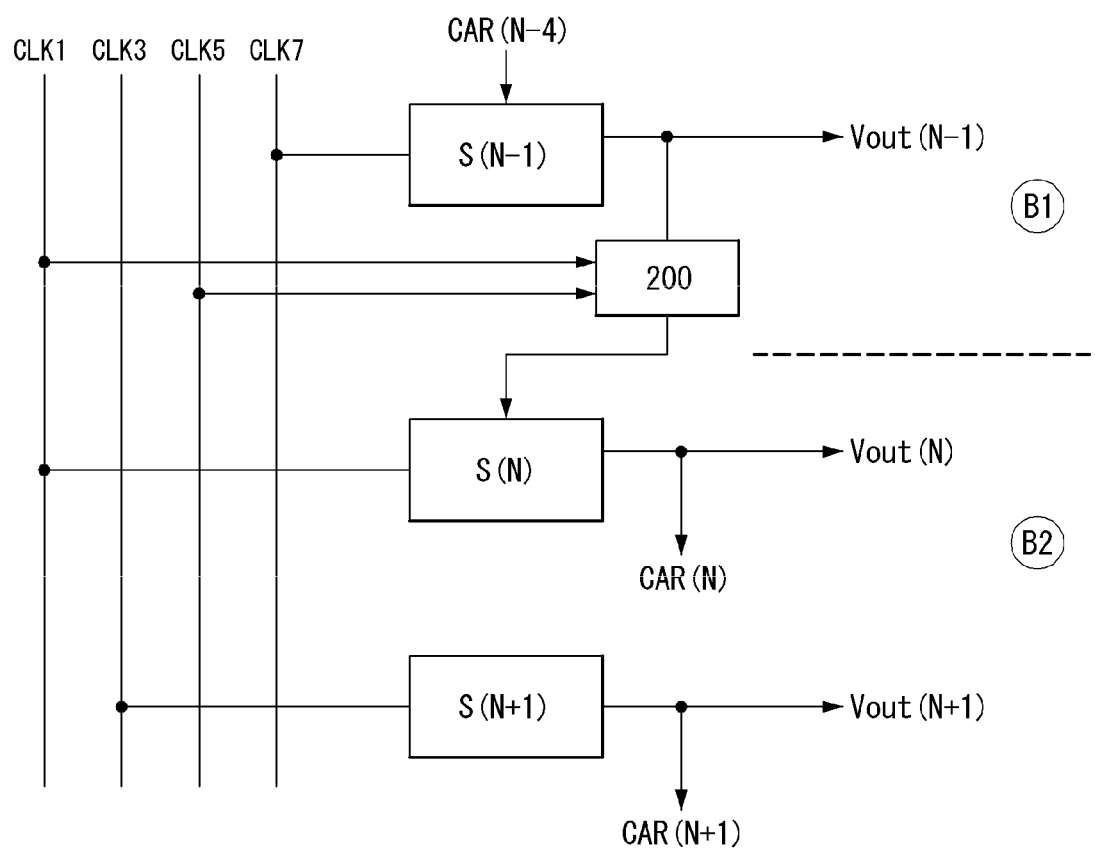
FIG. 6 is a diagram schematically illustrating a part of a GIP circuit disposed at a boundary between neighboring blocks.

Each of the GIP circuits 104 shifts a gate pulse in accordance with a shift clock CLK to sequentially supply the gate pulse to the gate lines 14 as shown in FIG. 4. The shift clock CLK may be a 2-phase clock to an 8-phase clock. FIG. 6 illustrates an 8-phase clock, but the shift clock CLK is not limited thereto.

The gate pulse output from the GIP circuit 104 swings between VGH and VGL. VGH is the gate-on voltage higher than the TFT threshold voltage of the pixel. VGL is lower than VGH and is the gate-off voltage lower than the TFT threshold voltage of the pixel. The TFTs of the pixels are turned on in response to VGH of the gate pulse to supply the data voltage from the data lines 12 to the pixel electrode.

FIG. 4 illustrates an example in which the GIP circuit 104 is disposed to the left and right of the pixel array 10 and is disposed on the left and right sides of the display panel 100. Left and right GIP circuits 104 are synchronized with the timing controller 106. The left GIP circuit 104 may be connected to odd-numbered gate lines 14 of the pixel array 10 to sequentially supply the gate pulse to the odd-numbered gate lines 14. The right GIP circuit 104 may be connected to even-numbered gate lines 14 of the pixel array 10 to sequentially supply the gate pulse to the even-numbered gate lines 14. The left GIP circuit 104 and the right GIP circuit 104 may be connected to all the gate lines to simultaneously supply the gate pulse to the same gate line.

The shift register of the GIP circuit 104 is connected in a cascade connection manner as shown in FIG. 6, and includes stages S(N−1), S(N), and S(N+1) for shifting the gate pulse in synchronization with the shift clock CLK timing. Each of the stages S(N−1), S(N) and S(N+1) sequentially supplies the gate pulse to the gate lines 14 and transmits carry signals CAR(N−4), CAR(N), and CAR(N+1) to another stage. The gate pulse and the carry signal may be the same signal output through one output terminal in each stage or may be separate signals that are provided through two separate output terminals in each stage.

The timing controller 106 transmits the digital video data of the input image received from a host system (not shown) to the data driver 102. The timing controller 106 receives timing signals such as a vertical synchronization signal Vsync, a horizontal synchronization signal Hsync, a data enable signal DE, and a main clock MCLK, which are received in synchronization with the data of the input image, and outputs a data timing control signal for controlling operation timing of the data driver 102, and a gate timing control signal for controlling operation timing of the level shifter 108 and the GIP circuit 104. The timing controller 106 generates a synchronization signal Tsync for synchronizing the display drivers 102, 104, and 108 and the touch sensing unit 110 using the timing signals received in synchronization with the data of the input image.

The gate timing control signal includes a start pulse VST, a gate shift clock (GCLK), a gate output enable signal (GOE), and the like. The gate output enable signal (GOE) may be omitted. The start pulse VST is input to a VST terminal in a first stage of the GIP circuit 104 to control output timing of a first gate pulse that occurs first in one frame period. The gate shift clock (GCLK) controls output timing of the gate pulse in each of the stages of the GIP circuit 104 to control shift timing of the gate pulse.

The touch sensing unit 110 drives the in-cell touch sensors C1 to C4 during the touch sensing period in response to the synchronization signal Tsync received from the timing controller 106. The touch sensing unit 110 supplies a touch driving signal to the in-cell touch sensors C1 to C4 through the sensor lines 16 during the touch sensing period, and detects capacitance changes of the in-cell touch sensors C1 to C4 depending on presence or absence of the touch input based on a voltage change of the sensor lines 16. That is, when a touch is applied to the pixel array 10, the capacitance of one or more of the in-cell touch sensors C1 to C4 is changed due to the touch, which may be detected by the touch sensing unit 110 during the touch sensing period as a change of voltage on one or more of the sensor lines 16. The touch sensing unit 110 compares an amount of capacitance change of each of the in-cell touch sensors C1 to C4 with a predetermined threshold value, determines that the in-cell touch sensor whose charge amount is changed beyond the predetermined threshold value is a touch input position, and calculates coordinates of the touch input position. The coordinate information of the touch input position is transmitted to the host system.

The host system may be implemented as any one of a television system, a set-top box, a navigation system, a DVD player, a Blu-ray player, a personal computer (PC), a home theater system, and a phone system. The host system converts the digital video data of the input image into a format suitable for display on the display panel 100. The host system transmits the timing signals (Vsync, Hsync, DE, MCLK) to the timing controller 106 together with the digital video data of the input image. The host system executes an application program associated with the coordinate information of the touch input received from the touch sensing unit 110.

FIG. 5 is a diagram illustrating a circuit configuration of the in-cell touch sensors C1 to C4 and the touch sensing unit 110.

Referring to FIG. 5, an electrode pattern of each of the in-cell touch sensors C1 to C4 may be formed as a divided pattern of the common electrode connected to the plurality of pixels 11. One touch sensor is connected to the plurality of pixels 11 to supply a common voltage to the plurality of pixels 11 during the display period, and is driven by the touch sensing unit 110 during the touch sensing period to sense the touch input.

The touch sensing unit 110 includes one or more multiplexers 111, one or more sensing circuits 112, and a micro control unit (MCU) 113.

The multiplexer 111 selects the sensor lines 16 connected to the sensing circuit 112 under a control of the MCU 113. The multiplexer 111 can supply the common voltage Vcom under the control of the MCU 113. Each multiplexer 111 can reduce the number of channels of the sensing circuit 112 by sequentially connecting N sensor lines 16 to a channel of the sensing circuit 112.

The sensing circuit 112 supplies charges to the in-cell touch sensors C1 to C4 through the multiplexer 111 and the sensor lines 16, amplifies and integrates the charge amount of the in-cell touch sensors C1 to C4 received through the multiplexer 111, and converts the integrated charge amount into digital data, and senses capacitance changes of the in-cell touch sensors depending on presence or absence of the touch input. To this end, the sensing circuit 112 includes an amplifier for amplifying a received touch sensor signal, an integrator for accumulating an output voltage of the amplifier, and an analog-to-digital converter (ADC) for converting a voltage of the integrator into digital data, and the like. The digital data output from the ADC is transmitted to the MCU 113 as touch raw data indicating the capacitance changes of the in-cell touch sensors C1 to C4 before and after the touch input.

The MCU 113 controls the multiplexer 111 to sequentially connect the sensor lines 16 to the sensing circuit 112 in a predetermined channel order. The MCU 113 compares the touch raw data received from the sensing circuit 112 with a predetermined threshold value to determine a touch input. The MCU 113 executes a predetermined touch sensing algorithm to calculate coordinates for each touch input position, generates touch coordinate data XY, and transmits the coordinate data XY to the host system.

FIG. 6 is a diagram schematically illustrating a part of a GIP circuit 104 disposed at a boundary between neighboring blocks B1 and B2.

Referring to FIG. 6, the GIP circuit 104 operates as a shift register using stages S (N−1) to S (N+1) that are connected in a cascade connection manner. Each of the stages S (N−1) to S (N+1) is connected to a respective gate line 14 through an output terminal to sequentially supply a gate pulse to the gate line 14 in synchronization with the shift clock timing. Each of the stages S (N−1) to S (N+1) pre-charges a Q node in response to a start pulse VST received at a VST terminal, or in response to a carry signal CAR (e.g., CAR (N−4), CAR (N−1) or CAR (N)) received from a previous stage, and raises a voltage of the output terminal to a gate-on voltage VGH when shift clocks CLK (e.g., shift clocks CLK1 to CLK7) are input to start outputting the gate pulse.

Figure 7:
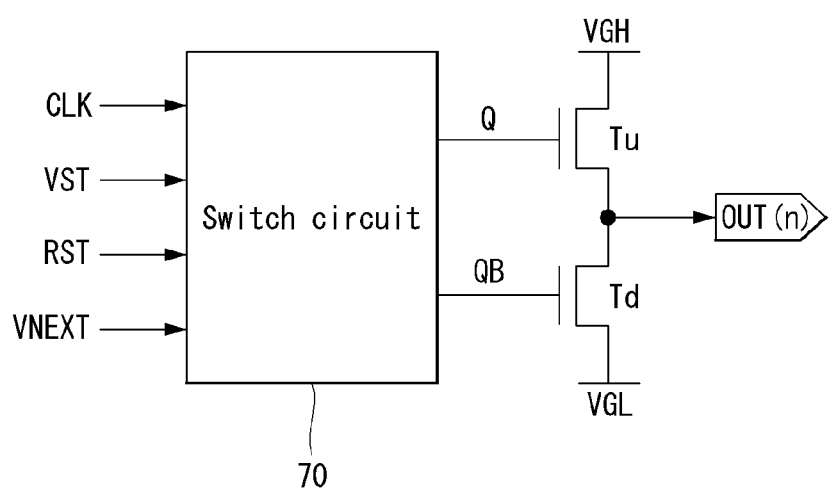
FIG. 7 is a diagram schematically illustrating one stage for outputting a gate pulse in a GIP circuit.
Figure 8:
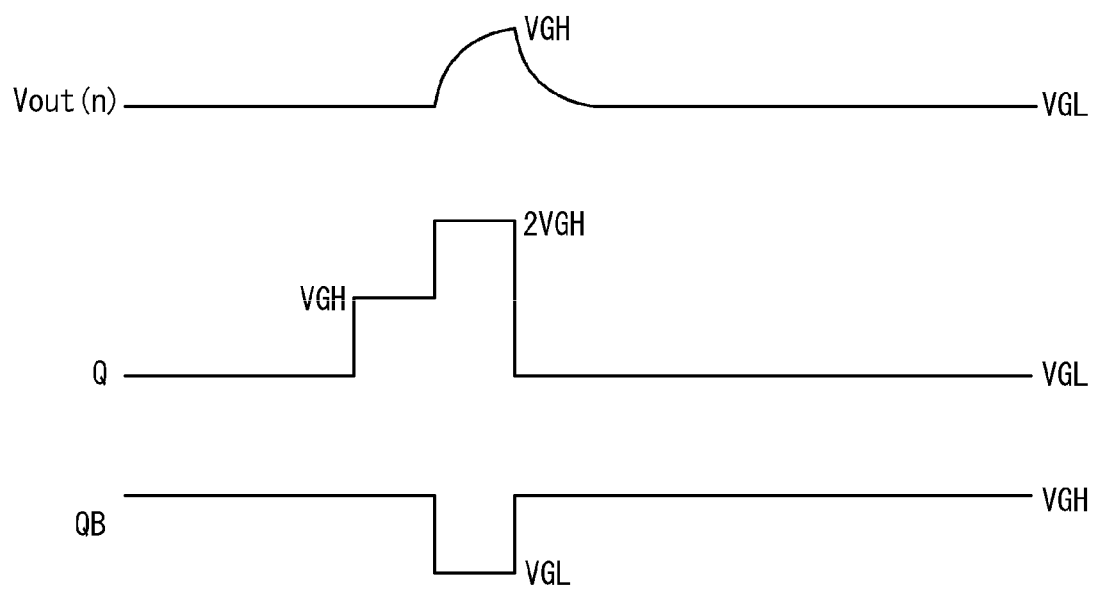
FIG. 8 is a waveform diagram illustrating operation of a stage shown in FIG. 7.

Each of the stages S (N−1) to S (N+1) may be implemented as a known gate driver or a known GIP circuit, and thus is not limited to a specific circuit. As shown in FIGS. 7 and 8, each of the stages includes a pull-up transistor Tu that charges an output terminal OUT(n) in response to a Q node voltage to raise an output voltage, a pull-down transistor Td that discharges the output terminal OUT(n) in response to a QB node voltage to lower the output voltage, and a switch circuit 70 for charging and discharging the Q node and the QB node. The output terminal OUT(n) of each of the stages is connected to the gate line 14 of the display panel. The output voltage Vout (n) is applied to the gate line 14.

When the Q node is pre-charged by a gate-on voltage VGH and a shift clock CLK is input to a drain, the pull-up transistor Tu charges the output terminal up to the gate-on voltage VGH of the shift clock CLK. When the shift clock CLK is input to the drain of the pull-up transistor Tu, the Q node voltage floated through a capacitance between the drain and a gate of the pull-up transistor Tu is raised to 2VGH by bootstrapping. At this time, the pull-up transistor Tu is turned on by the 2VGH voltage of the Q node and a voltage of the output terminal rises to the VGH. When the QB node voltage is charged by the VGH, the pull-down transistor Td supplies a gate-off voltage VGL to the output terminal to discharge the output voltage Vout (n) to VGL.

The switch circuit 70 charges the Q node in response to the start pulse VST input through the VST terminal or a carry signal CAR received from a previous stage and discharges the Q node in response to a signal received through an RST terminal or a VNEXT terminal. A reset signal for simultaneously discharging the Q node of all the stages S (N−1), S (N), and S (N+1) is applied to the RST terminal. A carry signal generated from a next stage is applied to the VNEXT terminal. The switch circuit 70 can charge and discharge the QB node as opposed to the Q node by using an inverter.

In FIG. 6, it is assumed that the (N−1)th stage S (N−1) (N is a positive integer of 2 or more) and the Nth stage S (N) are stages that generate output voltages Vout (N−1) and Vout (N) of the stages S (N−1) and S (N) at the boundary between neighboring blocks B1 and B2. The output voltages Vout (N−1) and Vout (N) may be voltages of the gate pulses applied to the gate lines or voltages of the carry signals outputted simultaneously with the gate pulses and applied to another stage.

The output voltage Vout (N−1) and Vout (N) is described below as a gate pulse, but is not limited thereto. For example, the output voltage Vout (N−1) and Vout (N) may be a carry signal output through a separate output terminal separated from the output terminal from which the gate pulse is output, or a separate signal different from the carry signal.

The (N−1)th stage S (N−1) generates a last gate pulse, that is, an (N−1)th gate pulse Vout (N−1) in a first display period. The Nth stage S (N) generates a first gate pulse, that is, an Nth gate pulse Vout (N) in a second display period immediately after a touch sensing period. A gate line connected to the (N−1)th stage S (N−1) and a gate line connected to the Nth stage S (N) may be adjacent to each other at the boundary between the blocks B1 and B2, but are not limited thereto.

The GIP circuit 104 includes a hold circuit 200 connected between the neighboring stages S (N−1) and S (N) at the boundary between the blocks.

The hold circuit 200 holds the output voltage of the (N−1)th stage S (N−1) during a predetermined time and then transmits it to the Nth stage S (N). The output voltage of the (N−1)th stage S (N−1) may be a gate pulse applied to the gate line, a carry signal, or a separate output voltage, but will be mainly described below with respect to the gate pulse.

The hold circuit 200 is connected between the output terminal of the (N−1)th stage S (N−1) and the VST terminal of the Nth stage S (N), stores the output voltage of the (N−1)th stage S (N−1) during the touch sensing period, and supplies the stored voltage to the VST terminal of the Nth stage S (N) at the end of the predetermined time, e.g., immediately before an end of the touch sensing period. When the number of divided blocks in the screen is M (M is a positive integer of 2 or more), M−1 hold circuits 200 may be included in the GIP circuit 104.

Figure 9:
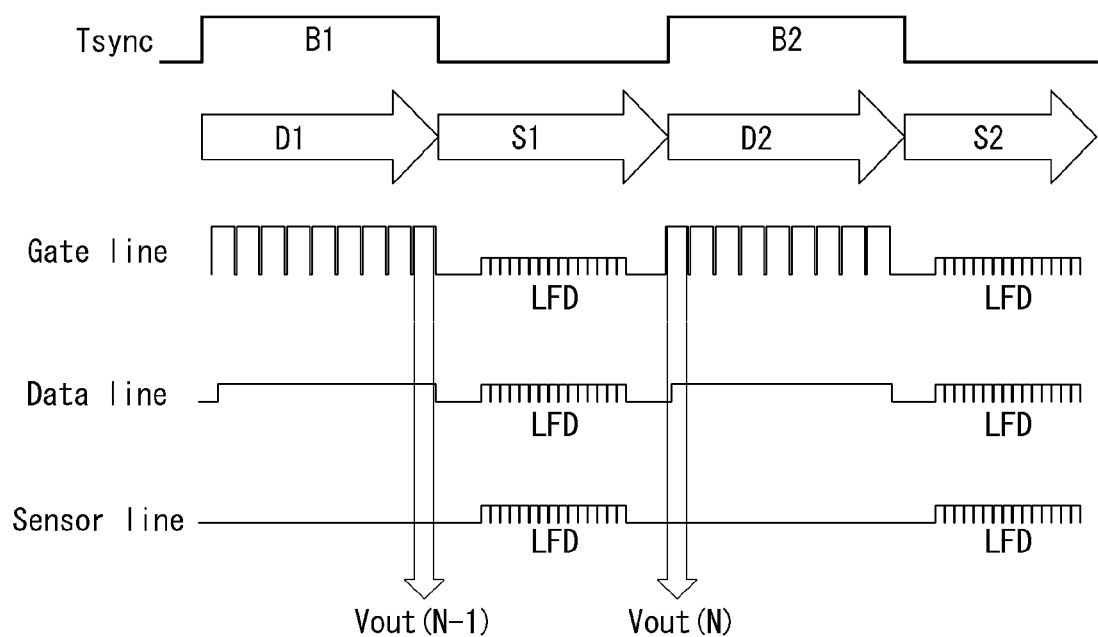
FIG. 9 is a waveform diagram illustrating a driving signal of a display device according to an embodiment of the disclosure.

FIG. 9 is a waveform diagram illustrating a driving signal of a display device according to an embodiment of the disclosure.

Referring to FIG. 9, one frame period may be time-divided into display periods D1 and D2 and touch sensing periods S1 and S2. One touch sensing period S1 and S2 is allocated between the display periods D1 and D2.

The display driver 102, 104, and 108 writes current frame data to pixels of a first block B1 during a first display period D1, and updates an image reproduced in the first block B1 with the current frame data. Pixels of a remaining block B2 other than the first block B1 during the first display period D1 maintain a previous frame data, and the touch sensing unit 110 does not drive in-cell touch sensors C1 to C4 during the first display period D1. The touch sensing unit 110 sequentially drives all the touch sensors C1 to C4 in a screen during a first touch sensing period S1 to sense a touch input. As a result of the sensing, the touch sensing unit 110 generates a touch report including coordinate information and identification information (ID) for each touch input, and transmits the touch report to the host system.

The display driver 102, 104, and 108 writes current frame data to pixels of a second block B2 during a second display period D2, and updates an image reproduced in the second block B2 with the current frame data. The pixels of the first block B1 during the second display period D2 maintain the current frame data, and the touch sensing unit 110 does not drive the touch sensors C1 to C4 during the second display period D2. The touch sensing unit 110 sequentially drives all the touch sensors C1 to C4 in the screen during a second touch sensing period S2 to sense a touch input. As a result of the sensing, the touch sensing unit 110 generates a touch report including coordinate information and identification information (ID) for each touch input, and transmits the touch report to the host system.

The touch sensing unit 110 supplies a sensor driving signal to the touch sensors through the sensor lines 16 during the touch sensing periods S1 and S2 to detect an amount of charge of the touch sensors before and after the touch input, and compares the amount of charge with a threshold voltage to determine a touch input. The touch sensing unit 110 transmits coordinate information of the touch input to the host system every touch sensing period S1 and S2. Therefore, a touch report rate is faster than a frame rate.

Since the in-cell touch sensors C1 to C4 are connected to the pixels 11, a parasitic capacitance between the in-cell touch sensors C1 to C4 and the pixels is large. Since the in-cell touch sensors C1 to C4 and the pixels 11 are coupled through the parasitic capacitance, they may adversely affect each other electrically. Therefore, the pixels 11 and the in-cell touch sensors C1 to C4 are time-divisionally driven.

In order to reduce the parasitic capacitance between the pixels 11 and the in-cell touch sensors C1 to C4, the data driver 102 may apply an AC signal LFD having the same phase as the sensor driving signal to the data lines 12 during the touch sensing periods S1 and S2. A parasitic capacitance between the data lines 12 and the in-cell touch sensors C1 to C4 is minimized if there is no voltage difference between the data lines 12 and the in-cell touch sensors C1 to C4. Therefore, when the AC signal LFD having the same phase as the sensor driving signal is applied to the data lines 12 when the sensor driving signal is supplied to the in-cell touch sensors C1 to C4, the parasitic capacitance between the data lines 12 and the in-cell touch sensors C1 to C4 can be minimized.

Similarly, in order to reduce the parasitic capacitance between the pixels 11 and the in-cell touch sensors C1 to C4, the GIP circuit 104 may apply an AC signal LFD having the same phase as the sensor driving signal to the gate lines 14 during the touch sensing periods S1 and S2. A parasitic capacitance between the gate lines 14 and the in-cell touch sensors C1 to C4 is minimized if there is no voltage difference between the gate lines 14 and the in-cell touch sensors C1 to C4. Therefore, when the AC signal LFD having the same phase as the sensor driving signal is applied to the gate lines 14 when the sensor driving signal is supplied to the in-cell touch sensors C1 to C4, the parasitic capacitance between the gate lines 14 and the in-cell touch sensors C1 to C4 can be minimized.

The touch sensing unit 110 may supply an AC signal LFD to sensor lines other than the sensor lines connected to the touch sensors for sensing a current touch input to minimize a parasitic capacitance between neighboring touch sensors.

When the AC signal LFD having the same phase as the sensor driving signal is applied to the data lines 12, gate lines 14 and sensor lines 16 of the display panel 100 during the touch sensing periods S1 and S2, the amount of charge of the parasitic capacitance of the display panel 100 can be minimized. When the parasitic capacitance of the in-cell touch sensors C1 to C4 is reduced, it is possible to improve a signal to noise ratio (SNR) of the in-cell touch sensors C1 to C4 to widen operation margin of the touch sensing unit 110 and improve the touch input and the touch sensitivity.

In FIG. 9, Vout (N−1) is an output voltage of the (N−1)th stage S (N−1) (N is a positive integer equal to or greater than 2) which is generated last in the first display period D1. Vout (N) is an output voltage of the Nth stage S (N) which is generated first in the second display period D2 in which pixel driving is performed immediately after the first touch sensing period S1. Therefore, after the (N−1)th gate pulse Vout (N−1) is applied to an (N−1)th gate line 14, and then the first touch sensing period S1 has elapsed, the Nth gate pulse Vout (N) is applied to the Nth gate line 14. The (N−1)th stage S (N−1) and the Nth stage S (N) are part of the GIP circuit 104 connected to the gate lines in the neighboring blocks. The (N−1)th stage S (N−1) and the Nth stage S (N) are connected in a cascade connection manner through the hold circuit 200 disposed therebetween to continuously outputs the gate pulses between neighboring blocks.

Figure 10:
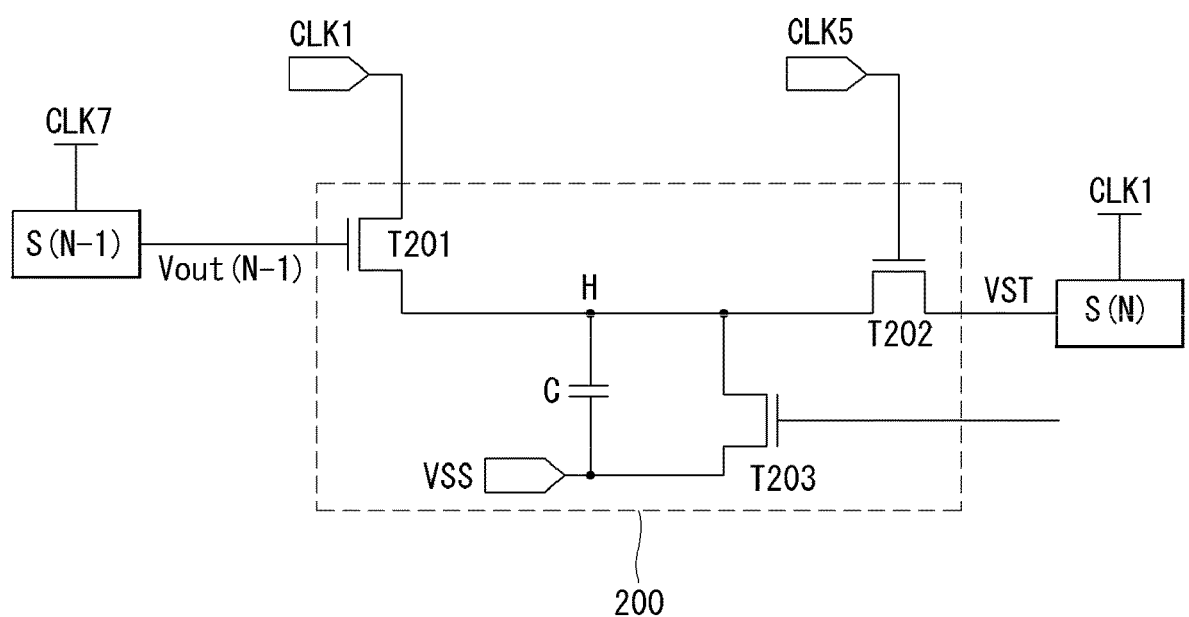
FIG. 10 is a circuit diagram illustrating an example of a hold circuit shown in FIG. 6.
Figure 11:
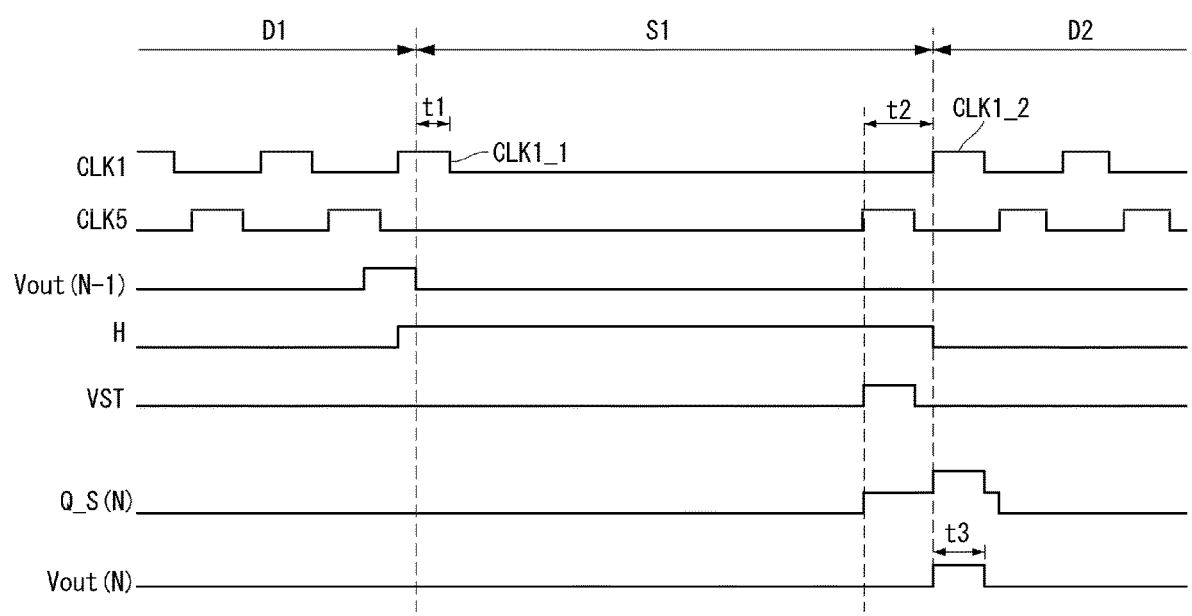
FIG. 11 is a waveform diagram illustrating operation of a hold circuit shown in FIG. 10.

FIGS. 10 and 11 are diagrams illustrating a hold circuit 200 and its operation according to an embodiment of the disclosure.

Referring to FIGS. 10 and 11, an (N−1)th stage S (N−1) is driven at an end of a first display period D1 to generate an (N−1)th gate pulse Vout (N−1) in response to a first shift clock CLK7. The (N−1)th gate pulse Vout (N−1) is generated as the last of a sequence of gate pulses applied to gate lines of a first block B1. The (N−1)th gate pulse Vout (N−1) may be applied to an (N−1)th gate line.

Figure 13:
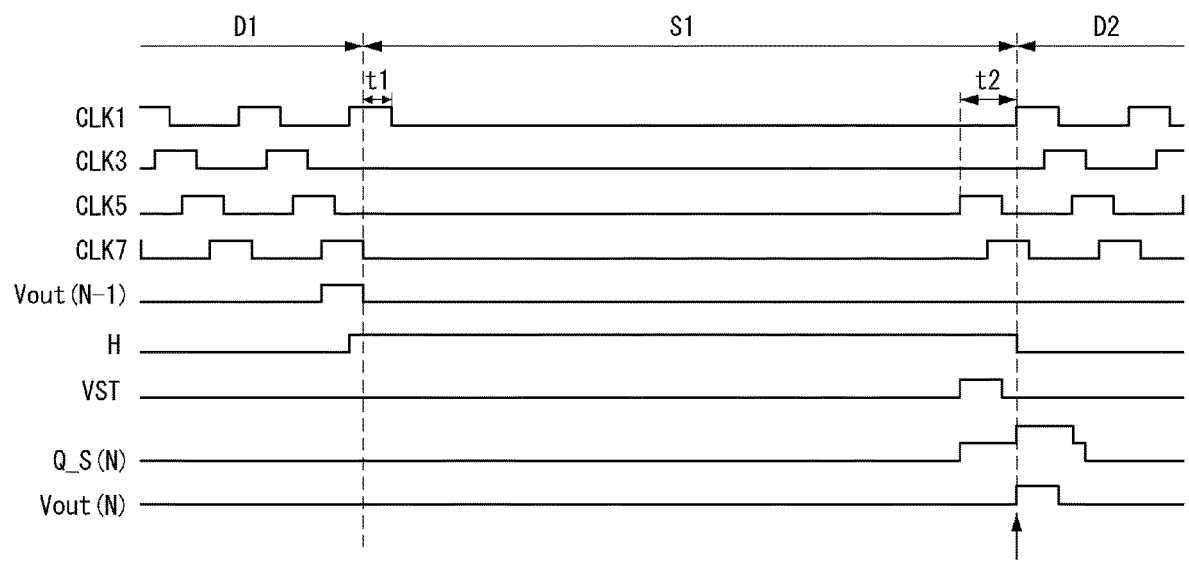
FIG. 13 is a waveform diagram illustrating operation of a hold circuit and stages shown in FIG. 12.

An Nth stage S (N) is driven at the same time as a start of a second display period D2 in which driving of pixels 11 is resumed after a touch sensing period S1, and outputs an Nth gate pulse Vout (N) in response to a second shift clock CLK1. The second shift clock CLK1 is generated following the first shift clock CLK7 as shown in FIG. 13. The Nth gate pulse Vout (N) is generated first among a sequence of gate pulses applied to gate lines of a second block B2. The Nth gate pulse Vout (N) may be applied to an Nth gate line.

The hold circuit 200 includes a first transistor T201, a second transistor T202, a third transistor T203, and a capacitor C. The hold circuit 200 is connected between an output terminal of the (N−1)th stage S (N−1) and a VST terminal of the Nth stage S (N), stores an output voltage Vout (N−1)

of the (N−1)th stage S (N−1) in the capacitor C during the touch sensing period S1, and supplies the stored voltage immediately before an end of the touch sensing period S1 to the VST terminal of the Nth stage S (N) to pre-charge a Q node of the Nth stage S (N).

The first transistor T201 is turned on depending on a gate-on voltage VGH of the (N−1)th gate pulse Vout (N−1) to store a gate-on voltage VGH of the second shift clock CLK1_1 generated at a start of the touch sensing period S1 in the capacitor C. To this end, the second shift clock CLK1_1 is generated at the same time as the start of the touch sensing period S1. The second shift clock CLK1_1 is generated following the (N−1)th gate pulse Vout (N−1) output from the (N−1)th stage S (N−1), and overlaps with a part of the (N−1)th gate pulse Vout (N−1). The first transistor T201 includes a gate connected to the output terminal of the (N−1)th stage S (N−1), a first electrode to which the second shift clock CLK1_1 is applied, and a second electrode connected to a hold node H and the capacitor C.

The capacitor C includes a first electrode connected to the hold node H, a second electrode connected to a VSS terminal, and a dielectric layer therebetween. A gate-off voltage, for example, VGL voltage, is applied to the VSS terminal. The gate-off voltage is lower than a threshold voltage of the transistors T201, T202 and T203.

The second transistor T202 is turned on depending on a gate-on voltage VGH of a third shift clock CLK5, and applies the voltage of the capacitor C to the VST terminal of the Nth stage S (N) at or near the end of the touch sensing period S1. To this end, the third shift clock CLK5 is generated at the end of the touch sensing period S1 immediately before the second display period D2. The third shift clock CLK5 generated at the end of the touch sensing period S1 does not overlap with the second shift clock CLK1_2 generated thereafter. The second transistor T202 includes a gate to which the third shift clock CLK5 is applied, a first electrode connected to the hold node H and the capacitor C, and a second electrode connected to the VST terminal of the Nth stage S (N).

The voltage supplied to the VST terminal of the Nth stage S (N) through the second transistor T202 pre-charges the Q node of the Nth stage S (N). In FIG. 11, Q_S (N) is a Q node voltage of the Nth stage S (N). When the Q node is pre-charged by VGH and the second shift clock CLK1_2, which is generated at the same time as a start of the second display period D2, is inputted to the Nth stage S (N), the Nth gate pulse Vout (N) is output.

The Q node voltage Q_S (N) of the Nth stage S (N) is in an uncharged state in which the gate-off voltage is maintained during the touch sensing period S1 except for a period t2 corresponding to the third shift clock CLK5 generated at the end of the touch sensing period S1. The Q node of the Nth stage S (N) is charged when the second transistor T202 is turned on depending on the third shift clock CLK5 generated at the end of the touch sensing period S1. Therefore, a pull-up transistor having a gate connected to the Q node of the Nth stage S (N) is not subjected to DC gate bias stress during the touch sensing period.

Figure 12:
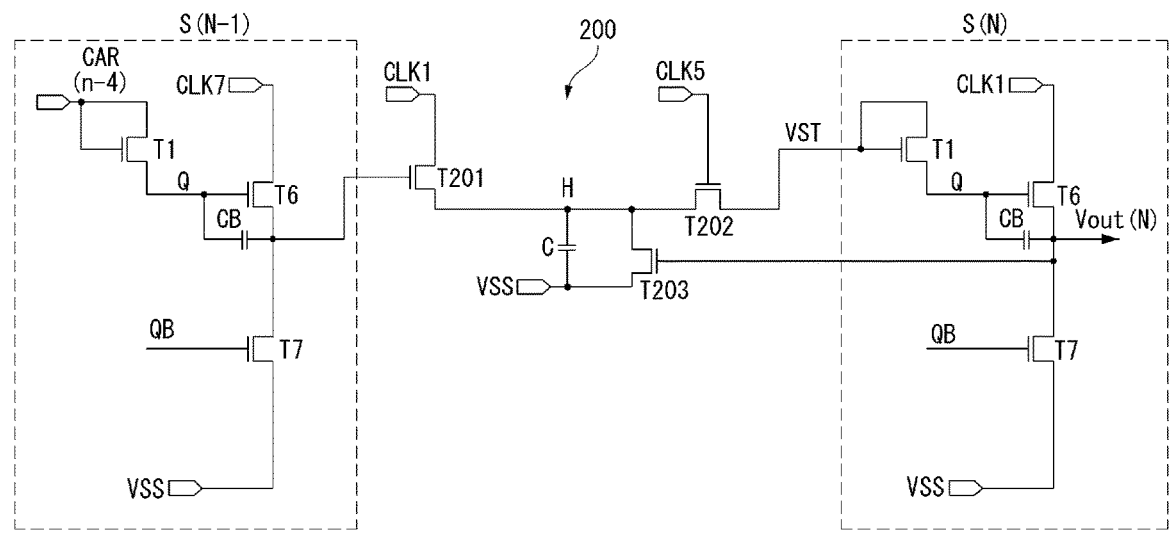
FIG. 12 is a circuit diagram illustrating an example in which a hold circuit shown in FIG. 6 is reset when an output voltage of an Nth stage is generated.
Figure 14:
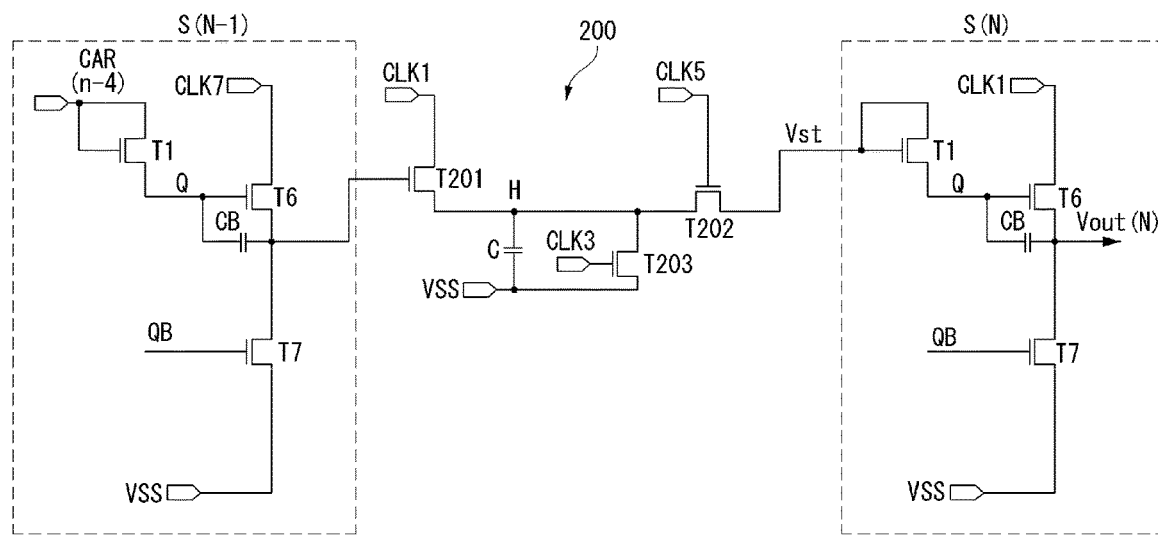
FIG. 14 is a circuit diagram illustrating an example in which a hold circuit shown in FIG. 6 is reset by a clock generated following an output voltage of an Nth stage.

The third transistor T203 is turned on depending on the Nth gate pulse Vout (N) output from the Nth stage S (N) to discharge the hold node H at the same time as the start of the second display period D2, or is turned on depending on a fourth shift clock CLK3 generated following the output voltage of the Nth stage S (N) to discharge the hold node H. Therefore, the third transistor T203 responds to the output voltage of the Nth stage S (N) or the fourth shift clock CLK3 generated thereafter as shown in FIGS. 12 to 14, and discharges the voltage of the hold node H to reset the hold circuit 200. The third transistor T203 includes a gate to which the output voltage Vout (N) of the Nth stage S (N) or the fourth shift clock CLK3 is applied, a first electrode connected to the hold node H, and a second electrode connected to the VSS terminal.

The shift clocks CLK1, CLK3, CLK5, and CLK7 maintain the gate-off or low-level (VGL) in most of the touch sensing period except for a period of t1+t2, as shown in FIG. 11. As shown in FIG. 11, the period t1 corresponds to a portion of the touch sensing period during which the second shift clock CLK1 is generated at the gate-on voltage VGH level, and the period t2 corresponds to a portion of the touch sensing period during which the third shift clock CLK5 or the first shift clock CLK7 (see FIG. 13) is generated at the gate-on voltage VGH level. The period obtained by adding the period t1 and the period t2 corresponds to a high period width of two clocks and can be approximately six horizontal periods. A period t3 in which the third transistor T203 is ON exists at the start timing of the second display period D2.

The voltage supplied to the VST terminal of the Nth stage S (N) through the hold circuit 200 has the same duty ratio as signal applied to VST terminals of the other stages. Therefore, there is no deterioration deviation of the transistors T6 and T7 (FIG. 12) because the stresses of the transistors T6 and T7, which have gates respectively connected to the Q node and the QB node, are the same in all stages.

None of the transistors T201, T202 and T203 of the hold circuit 200 has a gate connected to the hold node H. Therefore, there is almost no DC gate bias stress in the transistors T201, T202 and T203 constituting the hold circuit 200.

FIG. 12 is a circuit diagram illustrating an example in which a hold circuit shown in FIG. 6 is reset when an output voltage of an Nth stage is generated. FIG. 13 is a waveform diagram illustrating operation of a hold circuit and stages shown in FIG. 12.

Referring to FIGS. 12 and 13, each of the stages S (N−1), S (N) is implemented as the same circuit substantially. An (N−1)th stage S (N−1) includes a transistor T1 for charging a Q node depending on a carry signal CAR (N−4) from a previous stage, a pull-up transistor T6 whose gate is connected to the Q node, a capacitor CB connected between the gate and a source of the pull-up transistor T6, a pull-down transistor T7 whose gate is connected to the QB node, and the like. An output terminal of the (N−1)th stage S (N−1) is connected to an Nth gate line and also connected to a gate of a first transistor T201 through an input terminal of the hold circuit 200.

A gate of a transistor T1 for pre-charging a Q node in an Nth stage S (N) is connected to an output terminal of the hold circuit 200. An output terminal of the Nth stage S (N) is connected to an (N+1)th gate line.

The hold circuit 200 is substantially the same as that of FIGS. 10 and 11. In this hold circuit 200, a third transistor T203 is turned on depending on a gate pulse Vout (N) from the Nth stage S (N) to discharge a hold node H.

Figure 15:
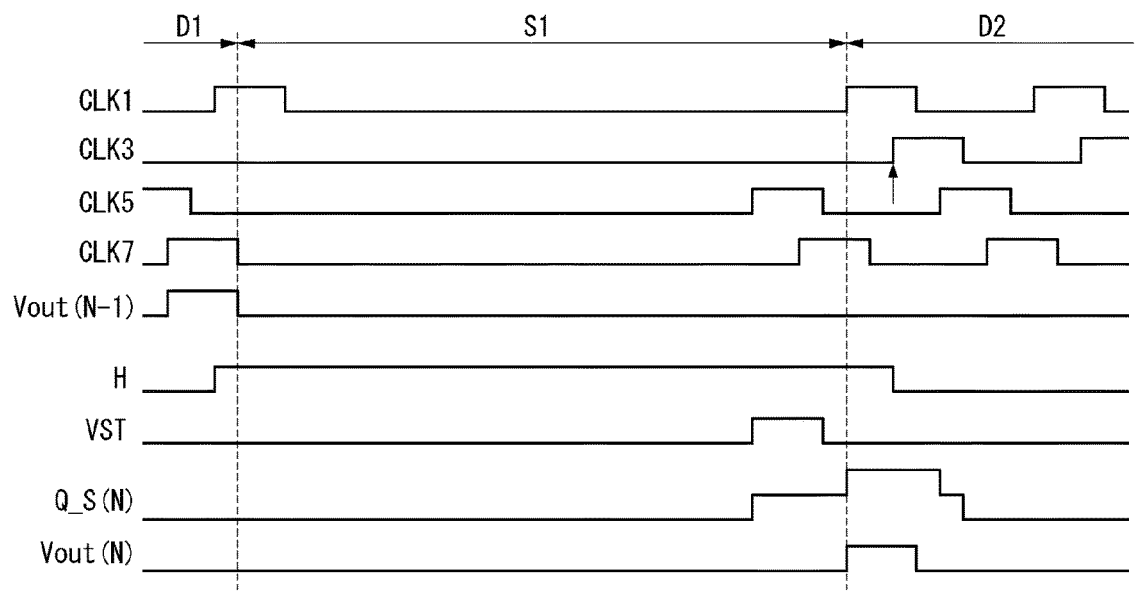
FIG. 15 is a waveform diagram illustrating operation of a hold circuit and stages shown in FIG. 14.

FIGS. 14 and 15 are diagrams illustrating an example in which a hold circuit shown in FIG. 6 is reset by a clock generated following an output voltage of an Nth stage.

Referring to FIGS. 14 and 15, the hold circuit 200 is substantially the same as that of FIGS. 10 and 11 described above. In this hold circuit 200, a third transistor T203 is turned on depending on a shift clock CLK3, which is generated following an Nth gate pulse Vout (N), to discharge a hold node H.

Transistors T201, T202, and T203 of the hold circuit 200 are preferably implemented as oxide transistors so that a voltage of the hold node H is not discharged by leakage current during a relatively long touch sensing period. The oxide transistors are suitable for high-resolution display devices because of their high response speed, and have an advantage of little leakage current because of their low off current.

Since the display device according to embodiments of the disclosure does not have the Q node voltage discharge of the GIP circuit during the touch sensing period, there is no deterioration of the image quality in the display period in which the pixel driving is resumed after the touch sensing period. The hold circuit 200 stores the output voltage of the last stage S (N−1) of the previous block B1 in the capacitor, and supplies the stored voltage to the VST terminal of the next block when the next block B2 is driven so that the Q node of the next block is pre-charged by a desired voltage.

In the embodiments of the disclosure, since the Q node voltage of the stages is not maintained in the charged state during the touch sensing period, the stress of the pull-up transistor of which the gate is connected to the Q node can be reduced, and the deterioration of the transistor can be reduced. Further, since the embodiments of the disclosure do not use a dummy stage (or a bridge circuit) and a separate clock wiring for driving the circuit, there is no pull-up transistor deterioration of the dummy stage and the bezel BZ on which the GIP circuit 104 is mounted can be reduced.

Moreover, the hold circuit 200 is not limited to storing the output voltage of the previous stage during the touch sensing period. For example, the hold circuit 200 may be applied to a use of storing an output voltage of a previous stage during a predetermined time between consecutive gate pulses, and then transmitting the output voltage to the next stage.

As described above, embodiments of the disclosure use a hold circuit that holds the output voltage of the (N−1)th stage during a predetermined time and supplies it to the Nth stage, thereby preventing stress deviation between stages of the GIP circuit and facilitating implementation of a narrow bezel of the display device.

Also, embodiments of the disclosure can stably drive the pixels and the touch sensors without degrading the image quality due to the Q node discharge of the GIP circuit during the touch sensing period.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A gate driver comprising:
    a shift register configured to sequentially supply gate pulses to gate lines of a display panel, the shift register including:
        an (N−1)th stage, where N is a positive integer equal to or greater than 2, configured to output an (N−1)th gate pulse;
        an Nth stage configured to output an Nth gate pulse; and
        a hold circuit configured to hold an output voltage of the (N−1)th stage during at least a part of a touch sensing period and supply the output voltage to the Nth stage,
    wherein an input terminal of the hold circuit is connected to an output terminal of the (N−1)th stage and an output terminal of the hold circuit is connected to a start input terminal of the Nth stage, and the hold circuit includes a capacitor which stores the output voltage of the (N−1)th stage during the at least a part of the touch sensing period.

2. The gate driver of claim 1, wherein the output voltage of the (N−1)th stage includes at least one of the (N−1)th gate pulse, a carry signal transmitted to another stage, or a separate output voltage different from the (N−1)th gate pulse and the carry signal.

3. The gate driver of claim 1, wherein the hold circuit supplies the stored voltage to the start input terminal of the Nth stage before an end of the touch sensing period,
    wherein the (N−1)th stage generates the output voltage through the output terminal when a first clock signal is input,
    wherein each of the (N−1)th stage and the Nth stage includes a respective pull-up transistor having a gate connected to a respective Q node and configured to raise a voltage of a respective gate pulse depending on a voltage of the Q node, and
wherein the Q node of the Nth stage is charged based on the output voltage supplied through the hold circuit.

4. The gate driver of claim 3, wherein the hold circuit further includes:
    a first transistor including a gate connected to the output terminal of the (N−1)th stage, a first electrode to which a second clock signal that is generated following the first clock is applied, and a second electrode connected to a hold node;
    a second transistor including a gate to which a third clock signal that is generated following the second clock signal is applied, a first electrode connected to the hold node, and a second electrode connected to the start input terminal of the Nth stage; and
    a third transistor including a gate to which at least one of an output voltage of the Nth stage or a fourth clock signal that is generated following the output voltage of the Nth stage is applied, a first electrode connected to the hold node, and a second electrode to which a gate-off voltage is applied
    wherein the capacitor includes a first electrode connected to the hold node and a second electrode to which the gate-off voltage is applied,
    wherein the gate-off voltage is lower than a threshold voltage of each of the first, second, and third transistors.

5. The gate driver of claim 4, wherein the Q node of the Nth stage maintains an uncharged state during the touch sensing period except for a portion of the touch sensing period in which the third clock signal is generated, and is charged when the second transistor is turned on based on the third clock signal.

6. The gate driver of claim 4, wherein the first, second, and third transistors include an oxide semiconductor.

7. A display device comprising:
a display panel in which data lines and gate lines are arranged in intersecting directions, pixels are arranged in a matrix form, a screen including the pixels and touch sensors is divided into at least first and second blocks, and the first and second blocks are time-divisionally driven during first and second display periods, respectively, with a touch sensing period between the first and second display periods;
a display driver configured to drive pixels of the first block during the first display period, drive pixels of the second block during the second display period after the touch sensing period, and write data of an input image to the pixels of the first and second blocks; and
a touch sensing unit configured to sense a touch input by driving the touch sensors during the touch sensing period,
wherein the display driver includes a shift register configured to sequentially supply gate pulses to the gate lines, the shift register including:
an (N−1)th stage, where N is a positive integer equal to or greater than 2, configured to output a last gate pulse of the first display period;
an Nth stage configured to output a first gate pulse of the second display period at a time corresponding to a start of the second display period after the touch sensing period; and
a hold circuit configured to hold an output voltage of the (N−1)th stage during at least a part of the touch sensing period and supply the output voltage to the Nth stage,
wherein an input terminal of the hold circuit is connected to an output terminal of the (N−1)th stage and an output terminal of the hold circuit is connected to a start input terminal of the Nth stage, and the hold circuit includes a capacitor which stores the output voltage of the (N−1)th stage during the at least a part of the touch sensing period.

8. The display device of claim 7, wherein the output voltage of the (N−1)th stage includes at least one of the last gate pulse of the first display period, a carry signal transmitted to another stage, or a separate output voltage different from the last gate pulse of the first display period and the carry signal.

9. The display device of claim 7, wherein the hold circuit supplies the stored voltage to the start input terminal of the Nth stage before an end of the touch sensing period,
wherein the (N−1)th stage generates the output voltage through the output terminal based on a first clock signal,
wherein each of the (N−1)th stage and the Nth stage includes a respective pull-up transistor having a gate connected to a respective Q node and configured to raise a voltage of a respective gate pulse depending on a voltage of the Q node, and
wherein the Nth stage charges the Q node based on the output voltage supplied through the hold circuit.

10. The display device of claim 9, wherein the hold circuit further includes:
a first transistor including a gate connected to the output terminal of the (N−1)th stage, a first electrode to which a second clock signal that is generated following the first clock signal is applied, and a second electrode connected to a hold node;
a second transistor including a gate to which a third clock signal that is generated following the second clock is applied, a first electrode connected to the hold node, and a second electrode connected to the start input terminal of the Nth stage; and
a third transistor including a gate to which at least one of an output voltage of the Nth stage or a fourth clock signal that is generated following the output voltage of the Nth stage is applied, a first electrode connected to the hold node, and a second electrode to which a gate-off voltage is applied,
wherein the capacitor includes a first electrode connected to the hold node and a second electrode to which the gate-off voltage is applied, wherein the gate-off voltage is lower than a threshold voltage of each of the first, second, and third transistors.

11. The display device of claim 10, wherein the Q node of the Nth stage maintains an uncharged state during the touch sensing period except for a portion of the touch sensing period in which the third clock signal is generated, and is charged when the second transistor is turned on based on the third clock signal.

12. A display device, comprising:
a pixel array;
a plurality of gate lines, each of the gate lines coupled to a respective plurality of pixels of the pixel array;
a plurality of touch sensors embedded in the pixel array; and
a gate driver including a shift register configured to sequentially supply gate pulses to the gate lines, the shift register including:
a first stage coupled to a first gate line of the plurality of gate lines;
a second stage coupled to a second gate line of the plurality of gate lines; and
a hold circuit having an input terminal connected to an output terminal of the first stage and an output terminal connected to an input terminal of the second stage, the hold circuit configured to hold a voltage in response to receiving an output of the first stage,
wherein the hold circuit includes a capacitor which stores the voltage during at least a part of a touch sensing period in which the touch sensors are driven.

13. The display device of claim 12, wherein the hold circuit further includes:
a first transistor having a gate terminal coupled to the output terminal of the first stage, a first conduction terminal coupled to a first clock output, and a second conduction terminal coupled to a first electrode of the capacitor, wherein the first transistor supplies a voltage of the first clock output to the first electrode of the capacitor in response to receiving the output of the first stage at the gate terminal of the first transistor.

14. The display device of claim 13, wherein the hold circuit further includes a second transistor having a gate terminal coupled to a second clock output, a first conduction terminal coupled to the first electrode of the capacitor, and a second conduction terminal coupled to the input of the second stage, wherein the second transistor supplies the voltage of the first clock output to the input of the second stage based on the second clock output.

15. The display device of claim 14, wherein the hold circuit further includes a third transistor having a gate terminal, a first conduction terminal coupled to the first electrode of the capacitor, and a second conduction terminal coupled to a second electrode of the capacitor.

16. The display device of claim 15 wherein the gate terminal of the third transistor is coupled to a third clock output, and the third transistor is configured to discharge the capacitor based on the third clock output.

17. The display device of claim 15 wherein the gate terminal of the third transistor is coupled to an output of the second stage, and the third transistor is configured to discharge the capacitor based on the output of the second stage.

18. The display device of claim 12, further comprising:
a plurality of touch sensor lines, each of the touch sensor lines coupled to a respective touch sensor; and
a touch sensing unit coupled to the touch sensor lines and configured to drive the touch sensors during the touch sensing period, wherein the touch sensing period is interposed between a first display period in which the first stage outputs a first gate pulse to the first gate line and a second display period in which the second stage outputs a second gate pulse to the second gate line.

19. The display device of claim 18, wherein the hold circuit is configured to hold the voltage for an entire duration of the touch sensing period.

* * * * *